US008973671B2

(12) United States Patent
Alsaif et al.

(10) Patent No.: US 8,973,671 B2
(45) Date of Patent: Mar. 10, 2015

(54) SMART COMPACT INDOOR FIREFIGHTING ROBOT FOR EXTINGUISHING A FIRE AT AN EARLY STAGE

(75) Inventors: Khalid A. Alsaif, Riyadh (SA); Byung Soo Kim, Gyunggi-do (KR)

(73) Assignee: King Abdulaziz City for Science and Technology, Riyadh (SA)

( * ) Notice: Subject to any disclaimer, the term of this patent is extended or adjusted under 35 U.S.C. 154(b) by 505 days.

(21) Appl. No.: 13/290,034

(22) Filed: Nov. 4, 2011

(65) Prior Publication Data

US 2013/0112440 A1 May 9, 2013

(51) Int. Cl.
*A62C 27/00* (2006.01)
*B62D 55/075* (2006.01)
*B62D 55/00* (2006.01)

(52) U.S. Cl.
CPC ................ *A62C 27/00* (2013.01); *Y10S 901/01* (2013.01)
USPC ............... 169/24; 169/52; 180/9.1; 180/9.42; 901/1

(58) Field of Classification Search
CPC .............................. A62C 27/00; B62D 55/075
USPC ........ 169/24, 46, 52, 56, 60, 61, 70; 239/172; 180/9.1, 9.32, 9.42, 9.5, 9.52; 901/1, 901/41, 49, 50
See application file for complete search history.

(56) References Cited

U.S. PATENT DOCUMENTS

| | | | | | |
|---|---|---|---|---|---|
| 2,360,397 | A | * | 10/1944 | Carpernter | 169/24 |
| 3,724,554 | A | * | 4/1973 | Rupert et al. | 169/52 |
| 3,762,478 | A | * | 10/1973 | Cummins | 169/24 |
| 4,420,047 | A | * | 12/1983 | Bruensicke | 169/53 |
| 4,678,041 | A | * | 7/1987 | Staudinger | 169/24 |
| 4,709,773 | A | * | 12/1987 | Clement et al. | 180/9.32 |
| 5,836,398 | A | * | 11/1998 | White | 169/24 |
| 5,860,479 | A | | 1/1999 | LaFollette | |
| 6,263,989 | B1 | * | 7/2001 | Won | 180/9.32 |
| 6,289,995 | B1 | * | 9/2001 | Fuller | 169/52 |
| 6,604,021 | B2 | | 8/2003 | Imai | |
| 6,832,604 | B1 | * | 12/2004 | Thompson | 124/75 |
| 7,182,144 | B2 | | 2/2007 | Baba | |
| 7,264,062 | B1 | * | 9/2007 | Ham | 169/52 |
| 7,283,057 | B2 | | 10/2007 | Kim | |
| 7,332,890 | B2 | | 2/2008 | Cohen | |
| 7,478,817 | B1 | * | 1/2009 | Carrier | 180/6.48 |
| 7,619,534 | B2 | | 11/2009 | Barrieau | |
| 7,631,700 | B1 | * | 12/2009 | Gil | 169/24 |
| 7,909,112 | B2 | | 3/2011 | Decker | |
| 7,933,684 | B2 | | 4/2011 | Sugino | |
| 2001/0013828 | A1 | | 8/2001 | Geerts | |
| 2004/0073337 | A1 | | 4/2004 | McKee | |
| 2007/0296570 | A1 | | 12/2007 | Barrieau | |
| 2010/0038098 | A1 | | 2/2010 | Groonwald | |
| 2011/0232925 | A1 | * | 9/2011 | Al-Azemi | 169/52 |

* cited by examiner

*Primary Examiner* — Darren W Gorman
(74) *Attorney, Agent, or Firm* — Jeffrey Furr, Esq.; Furr Law Firm

(57) ABSTRACT

The proposed invention is an indoor firefighting robot which has the capability to climb stairs and negotiate several types of floor materials inside buildings. it can withstand very high temperature up to 700 Celsius for as long as 60 minutes using multiple thermal insulation technique. It can communicate with trapped and injured persons inside the fire scene and can send back video and audio information describing the fire environment inside the building to the controller. It has also an insulated container at the rear with oxygen masks to help victims to breathe safely in the smoke environment in the early stage of the firefighting process. Several of these compact firefighting robots can be launched and can work together inside the room or multiple rooms under fire with assistance of remote control unit. The fire robot can avoid obstacles while trying to rescue injured victims.

18 Claims, 14 Drawing Sheets

SMART COMPACT INDOOR FIREFIGHTING ROBOT FOR EXTINGUISHING A FIRE AT AN EARLY STAGE

CROSS-REFERENCE TO RELATED APPLICATIONS

None

STATEMENT AS TO RIGHTS TO INVENTIONS MADE UNDER FEDERALLY-SPONSORED RESEARCH AND DEVELOPMENT

None

BACKGROUND OF INVENTION

Field of the Invention

The current invention is an indoor firefighting robot which has the capability to climb stairs and negotiate several types of floor materials inside buildings especially at an early stage.

BACKGROUND OF THE INVENTION

1. Technical Field

This invention is directed to the fire fighting robots to assist in the indoor fighting.

2. Description of the Prior Art

Indoor fire fighting subjects rescue personnel to severe risks; both physical and mental. There are numerous risks for fire fighting personnel who go in to battle this indoor fires such as intense heat, explosion, falling parts of buildings, sharp objects, and the risk of falling when the range of vision is reduced or is nonexistent and mental risks due to extremely stressful situations.

The current means to fight indoor fires are for the fireman to enter the burning areas to fight the fires and to perform rescues. This a very dangerous for the firefighter. There also exists a need for a device to pre-install a firefighting device within a house, business or building to fight indoor fights.

The ability to fight a fire at an early stage before it spreads is paramount in the fighting of fires. It can save lives and money.

There exists a need for firefighters to combat the fire and assist in fire rescue that reduces their risks in hot and smoke-filled indoor areas especially during the early stages of the fire.

SUMMARY OF THE INVENTION

Considering the above, a primary object is therefore to provide an indoor firefighting robot to assist those in need in a fire.

The current invention is an indoor firefighting robot. It has the capability to climb stairs and negotiate several types of floor materials inside buildings with a design so that it can withstand very high temperature up to 700 celsius for as long as 60 minutes using multiple thermal insulation techniques.

The robot will be able to communicate with trapped and injured persons inside the fire scene and can send back video and audio information describing the fire environment inside the building to the controller. It has also an insulated container at the rear with oxygen masks to help victims to breathe safely in the smoke environment in the early stage of the firefighting process. Several of these compact firefighting robots can be launched and can work together inside the room or multiple rooms under fire with assistance of remote control unit. The fire robot can avoid obstacles while trying to rescue injured victims. If the robot is outside the building it can use camera and sensors for navigation.

BRIEF DESCRIPTION OF THE DRAWINGS

These and other features of the invention will be more clearly understood from a consideration of the following description, taken in connection with the accompanying drawings, in which.

DETAILED DESCRIPTION

The proposed invention is an indoor firefighting robot which has the capability to climb stairs and negotiate several types of floor materials inside buildings. It is designed to withstand very high temperature up to 700 Celsius for as long as 60 minutes using multiple thermal insulation techniques. It can communicate with trapped and injured persons inside the fire scene and can send back video and audio information describing the fire environment inside the building to the controller. It has also an insulated container at the rear with oxygen masks to help victims to breathe safely in the smoke environment in the early stage of the firefighting process. Several of these compact firefighting robots can be launched and can work together inside the room or multiple rooms under fire with assistance of a remote control unit 750. The fire robot 1 can avoid obstacles while trying to rescue injured victims. If the robot 1 is outside the building it can use camera 100 and sensors for navigation.

Figure 1:
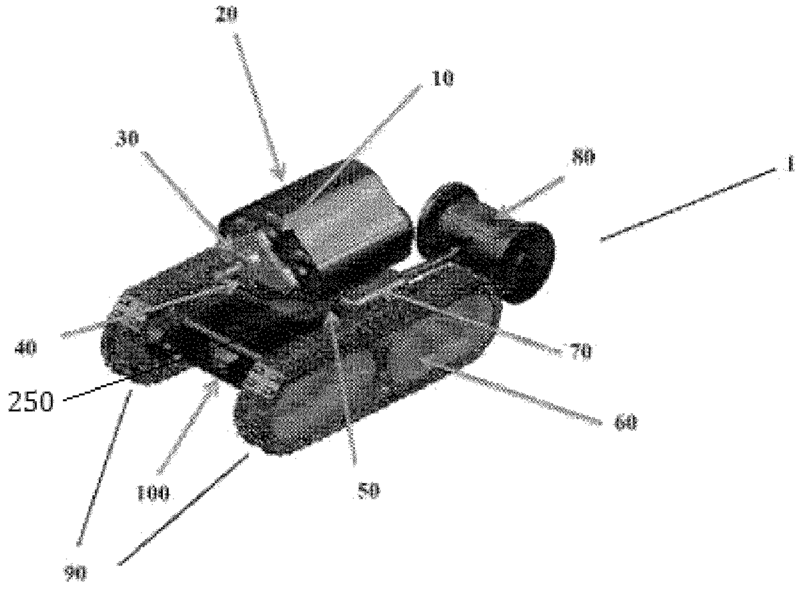
FIG. 1 shows the device with its major components.
Figure 2:
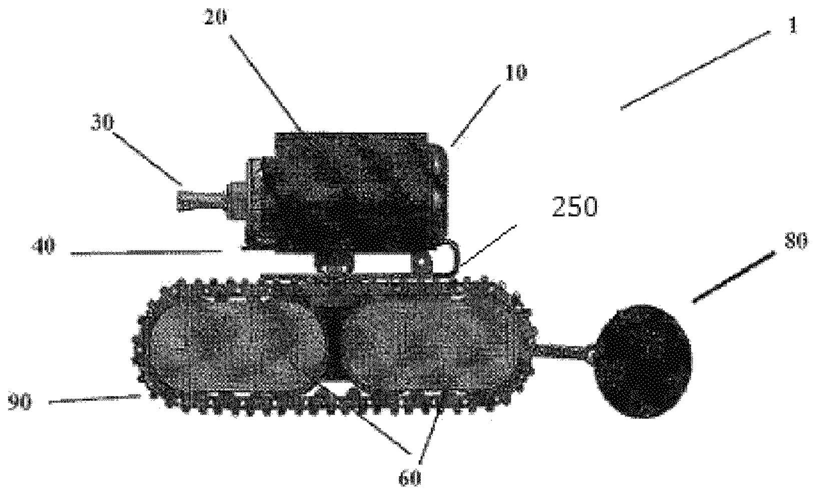
FIG. 2 shows a side view of the device.

The fight fighting robot 1 has some major components as shown in FIG. 1 and FIG. 2. There is an Smart platform 250 with adaptable track shape, temperature resistant tracks 90 and gears 65, thermally isolated electronic modules and controllers, thermally isolated cameras 100, specially designed nozzle 30 for optimum fire extinguishing, smoke detectors, water tank for electronics cooling 70, cylinders with fire distinguishing agent 10, Navigation sensors, Pan/tilt mechanism 300, Oxygen Mask 52 and an Oxygen Mask Container 80.

FIG. 1 displays the track covers 60 that cover the track 90 and the gears 65. The tracks 90 are on the sides of the platform and provide movement for the platform. The driving camera 100 is in the central front of the platform.

Figure 3:
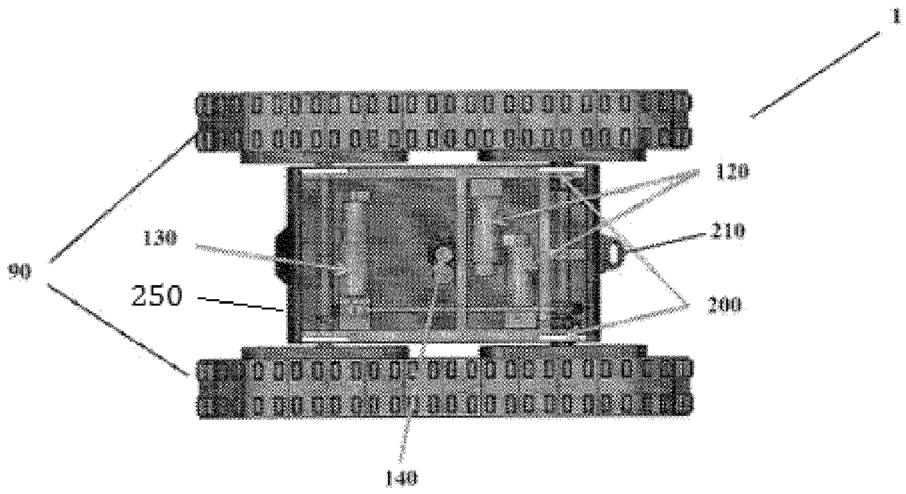
FIG. 3 shows a bottom view of the device.

FIG. 3 shows the bottom of the platform with the shape shift motor 130, a pair of driving motors 120 which drive a double shafts 200 to move the robot 1 forward or backward. Since the driving motors 120 each drive a track 90 the tracks

90 can move in opposite directions allowing the robot 1 to turn in place and allows for maximum movement abilities such as allowing the robot 1 to spin and move 360 degrees. The pan/tilt motor 140 which comprises of a DC motor and linear actuator which is used to move the Pan/Tilt Mount (300) 360 degrees and move the pan/tilt extinguishing system platform 320 up and down. There is a connecting link 210 on the back of platform 250 on to which the oxygen mask container 80 connects to.

Figure 4:
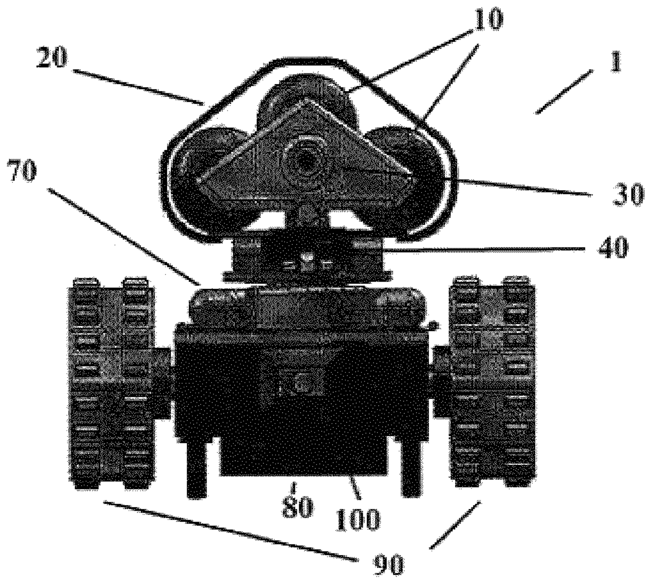
FIG. 4 shows a front view of the device.

FIG. 4 shows a front view of the robot 1 and its components. The driving camera 100 is located on the front of the robot 1.

Figure 5:
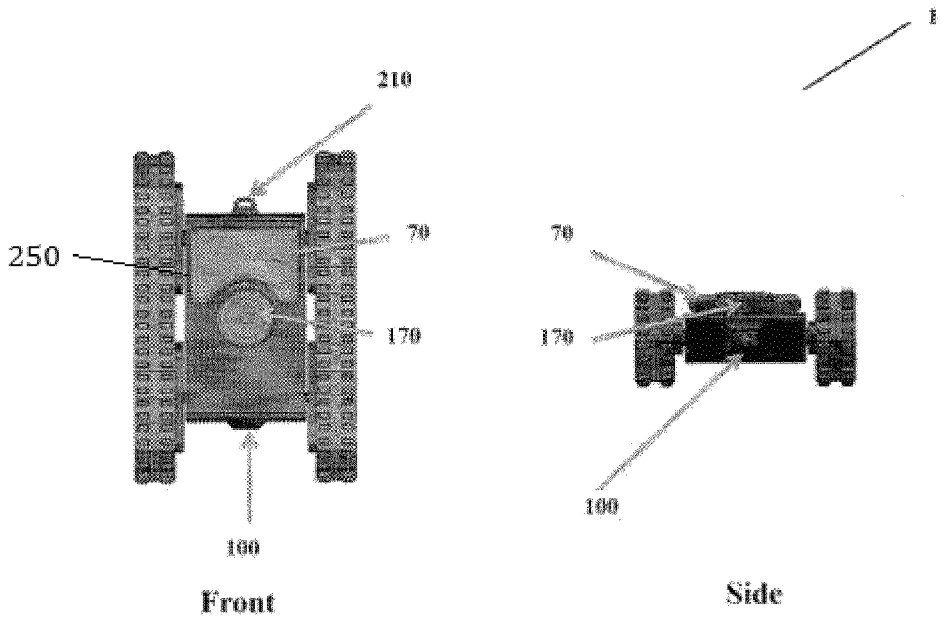
FIG. 5 shows a top and side view of the carriage of the device without the Pan/Tilt mount.

The platform 250 without the extinguishing device 260 or the Pan/Tilt Mount 300 is shown in FIG. 5. It shows the water tank 70 that is connected to the water sprinkler unit 170. The water sprinkler unit 170 sprays water to lower the temperature of the platform 250 when needed. The platform 250 also has the driving camera 100 which is used by the user to know where the robot 1 is going so that they can control the direction and movement of the robot 1 if needed through a remote control device 750. The driving camera 100 is installed within the platform that is thermally insulated and has a quartz glass cover.

Figure 6:
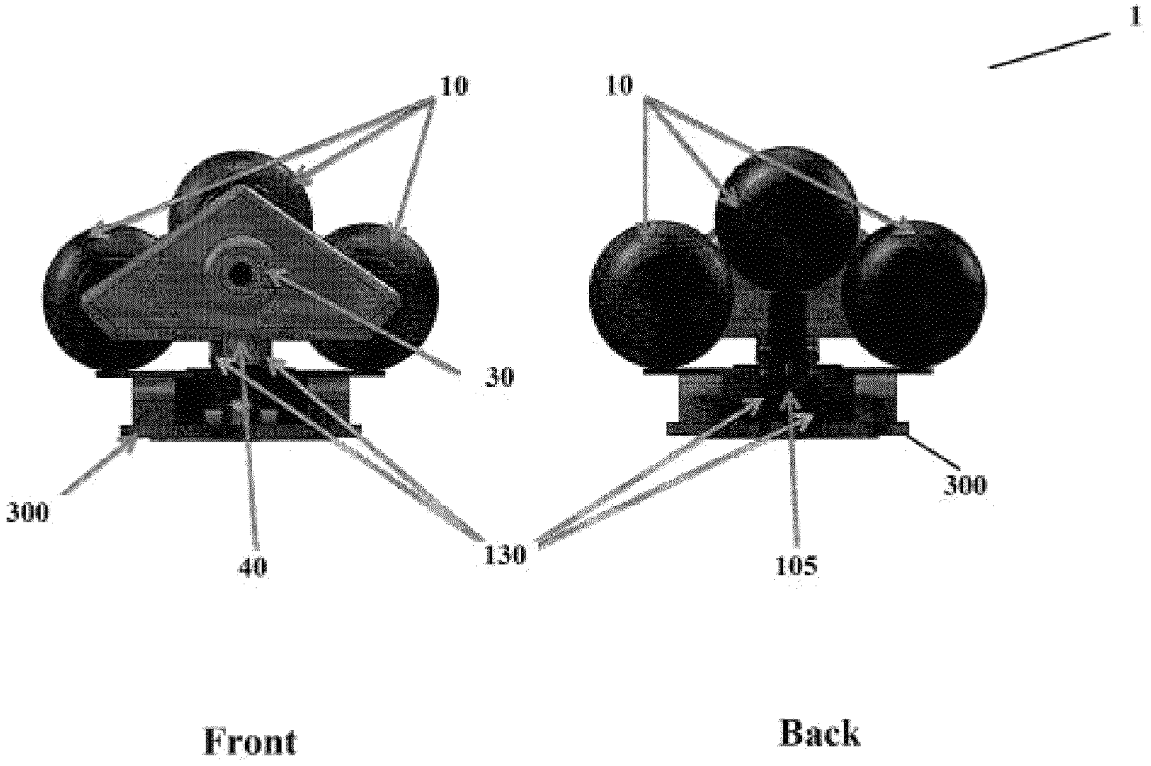
FIG. 6 shows a front and back view of the Pan/Tilt mount.
Figure 7:
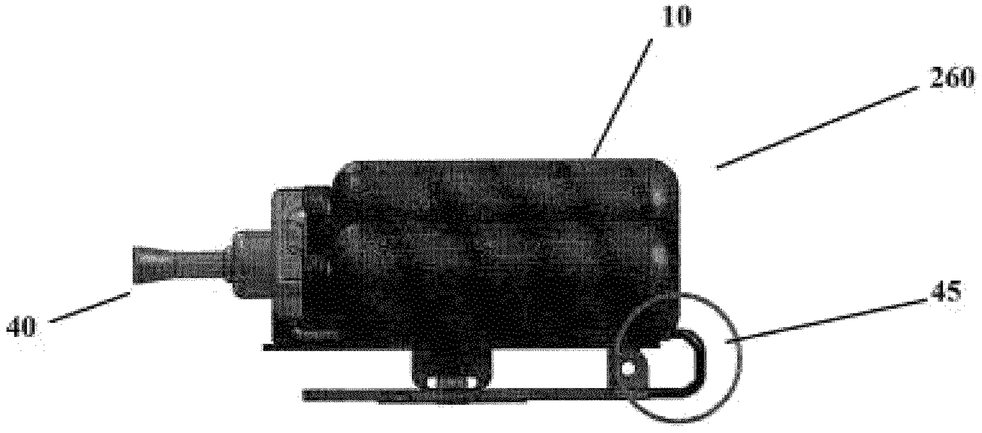
FIG. 7 shows the extinguishing system.
Figure 12:
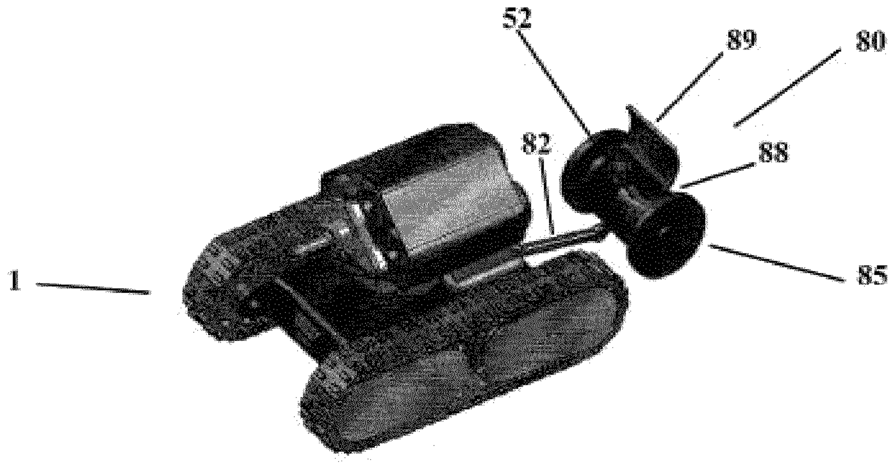
FIG. 12 shows the oxygen mask container being connected to the platform.

The extinguishing system 260 is located on the Pan/Tilt Mount 300 as shown in FIGS. 6 and 7. It consists of a plurality of extinguishing agent canisters 10 (3 in the preferred embodiment) that are connected to an extinguisher nozzle 30 through a nozzle open/close wire unit 130. The extinguishing system also has a vision optical fiber bundle 105 located on the rear portion of the Pan/Tilt mount 300. The vision optical fiber bundle 105 is used for vision from the extinguishing system. The nozzle 30 expellant spray location is controlled by the Pan/Tilt mount 300 which can control the direction and angle that the nozzle 30 is facing to deliver the extinguishing agent. The vision optical cable and the nozzle open/close wire unit is protected by a flexible metal tube 45. As shown in FIGS. 1, 2 and 12 the extinguishing system 260 is protected by an extinguisher cover 20 which is connected to the Pan/Tilt Mount 300 and covering the extinguishing system 260. The robot 1 has an extinguisher vision system 40 located at the front of the Pan/Tilt Mount 300 below the extinguishing system 260 and it is used for providing vision information to the operator.

Figure 8:
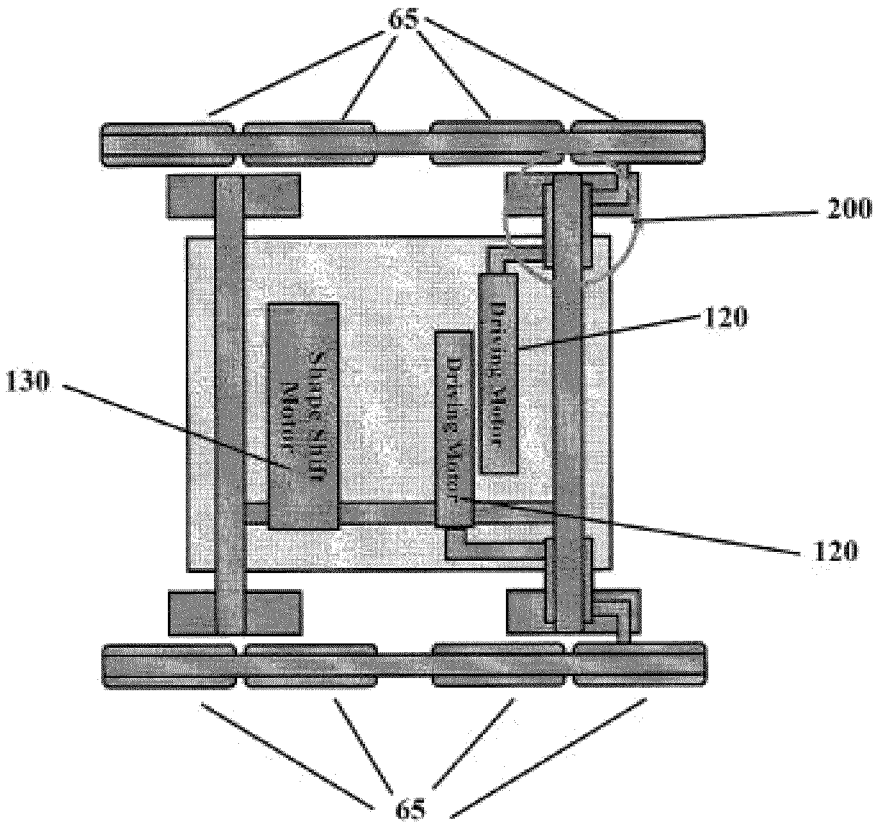
FIG. 8 displays the driving means.

FIG. 8 displays the driving means shape shift consisting of a motor 130, a pair of driving motors 120 which drive a double shafts 200 to move the robot 1 forward or backward. The double shafts 200 move the gears 65 which drives the tracks 90. Since the driving motors 120 each drive a track 90 the tracks 90 can move in opposite directions allowing the robot 1 to turn in place and allows for maximum movement abilities such as allowing the robot 1 to spin and move 360 degrees.

Figure 9:
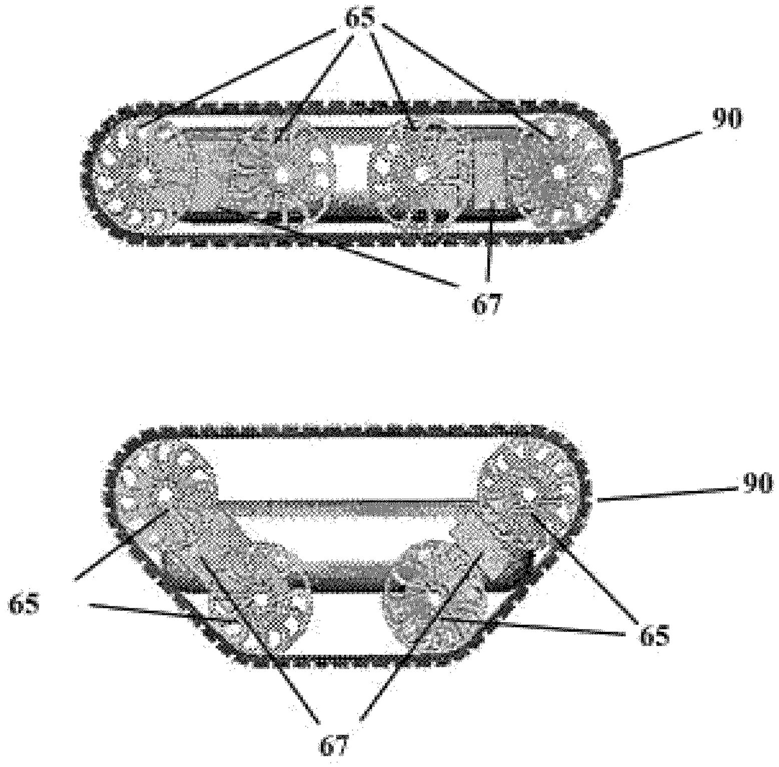
FIG. 9 displays the different track formations.

The firefighting robot 1 can have different track formations as shown in FIG. 9. This is accomplished using a shape shift motor to change the track 90. This is done to overcome obstacles. The track 90 is driven by track gears 65 which in the preferred embodiment are set two per track wheel base 67. The shape shift motor changes the angle of the track wheel base 67 and changes the shape of the track 90.

Figure 10:
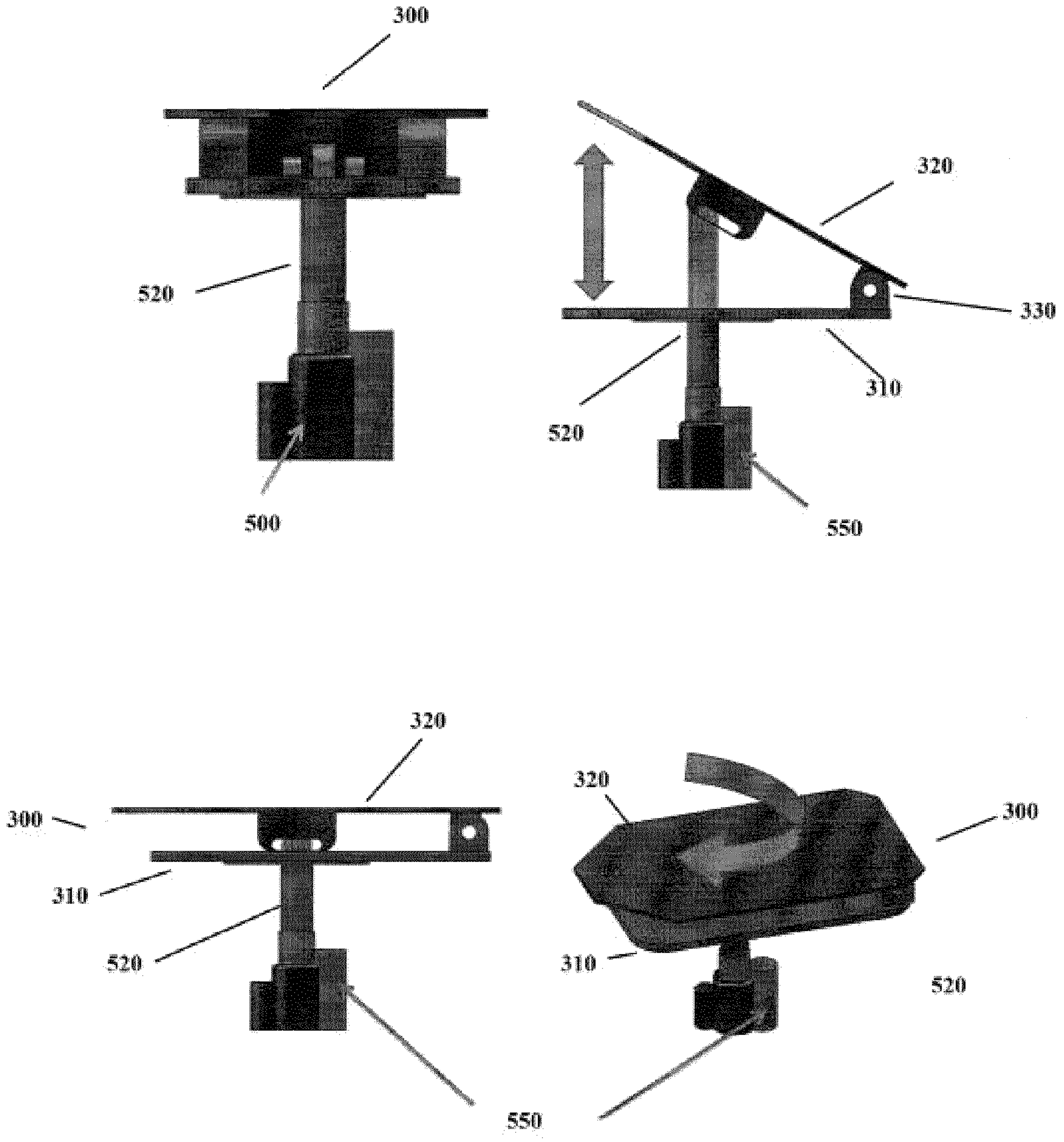
FIG. 10 displays the Pan/Tilt mount and how it moves.

FIG. 10 displays the pan/tilt mount 300 and how it moves. There is a pan/tilt motor 140 which comprises of a DC motor 550 and linear actuator 500 which is used to move the Pan/Tilt Mount (300) 360 degrees and move the pan/tilt extinguishing system platform 320 up and down. The pan/tilt mount 300 is comprised of the pan/tilt extinguishing system platform 320 connected to a pan/tilt base 310 by a pan/tilt axis 330. The linear actuator 500 moves the pan/tilt pole 520 up and down and the pan/tilt pole 520 is connected to the extinguishing system platform 320 moving the extinguishing system platform 320 up and down while connected to the pan/tilt axis 330. The DC motor 550 rotates the pan/tilt pole 520 which is connected to and rotates the Pan/Tilt mount 300.

Figure 11:
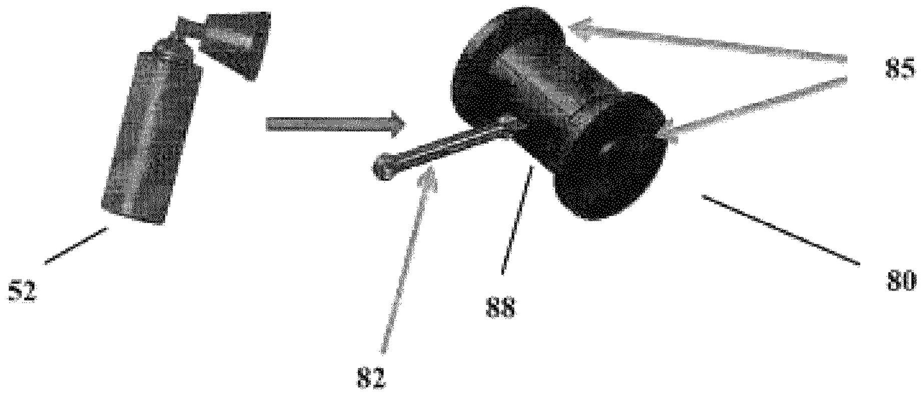
FIG. 11 shows the oxygen mask container and an oxygen mask.

The robot 1 has an insulated container at the rear with oxygen masks 52 to help victims to breath safely in the smoke environment in the early stage of the firefighting process. FIG. 11 shows the oxygen mask container 80 which is insulated and an oxygen mask 52 where the oxygen mask 52 goes into the oxygen mask container 80. The oxygen container 80 is comprised of a oxygen mask cylinder 88 which has two free wheel 85 attached allowing it to by pulled by the platform 250. The oxygen mask container 80 has a platform link unit 82 which connects to the connecting link 210 on the back of platform 250 as shown in FIG. 12. The oxygen mask 52 is placed inside the oxygen mask container 80 by opening the oxygen mask container door 89 as shown in FIG. 12. The oxygen mask container 80 is designed be pulled behind the platform 250 to provide an oxygen mask 52 to persons trapped by the fire or firefighters fighting the fires.

Figure 13:
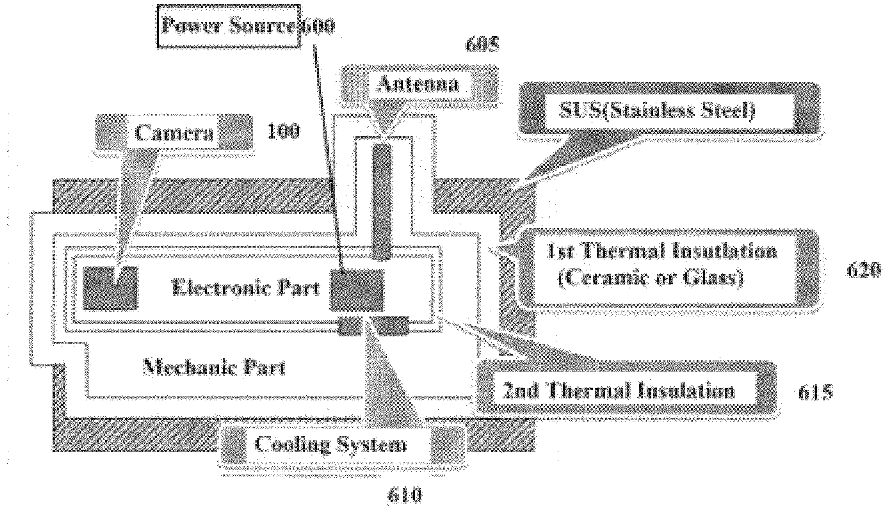
FIG. 13 shows the components being protected by thermal insulation.

The firefighting robot 1 is designed to withstand very high temperature up to 700 Celsius for as long as 60 minutes using a multiple thermal insulation technique. The device's thermal insulation concept is displayed in FIG. 13. The device 1 has a Double thermal insulation structure with a cooling system 610 between first 600 and second 615 thermal structure with the thermal structure being comprised of a ceramic or glass material which has a low thermal conductivity and strong thermal shock resistance. The cooling system 610 protects the electronics of the robot 1 including the camera 100, antenna 605 and power source 600. The robot's outer layer is comprised of a strong heat resistant material such as stainless steel 620.

Figure 14:
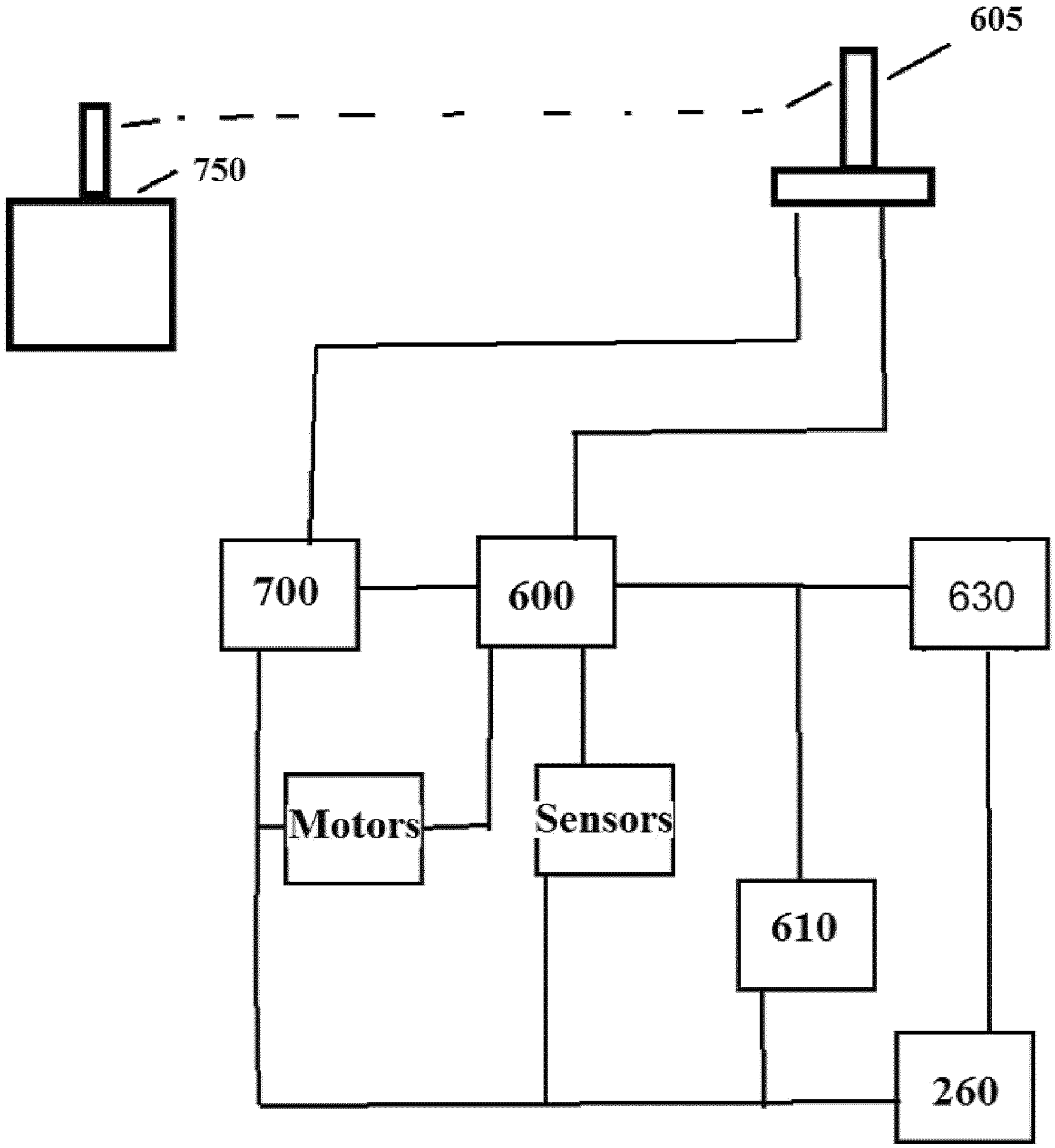
FIG. 14 shows the power system components.

FIG. 14 is a simplified layout of the power source 600 and the electronic components. The power source 600 in the preferred embodiment would be a battery which would provide power to the motors, camera, cooling system, the extinguisher vision system, and the water sprinkler unit. The robot 1 has a computing means 700 which contracts the robot 1. It will be programmed for the the robot 1 to analyze and fight fires. It will relay messages from a remote control device 750 from the user when the user needs to control the robot 1 by the antenna 605. In the preferred embodiment, the robot 1 will also have one or more smoke detectors 630.

The robot 1 will be able to communicate with trapped and injured persons inside the fire scene and can send back video and audio information describing the fire environment inside the building to the controller. It has also an insulated container at the rear with oxygen masks to help victims to breath safely in the smoke environment in the early stage of the firefighting process. Several of these compact firefighting robots can be launched and can work together inside the room or multiple rooms under fire with assistance of remote control unit. The fire robot can avoid obstacles while trying to rescue injured victims. If the robot is outside the building it can use camera and sensors for navigation.

Operation

In the preferred embodiment, the fire fighting robot 1 would be pre-installed in house. The robot 1 will automatically detect a fire or is notified by user that there is fire in the house. The user can remotely control fire fighting robot 1 to get it to the location of fire and the robot will work to extinguish the fire.

The device can provide search and rescue and provide environmental information to the user and/or human fire fighters. The robot moves by using the camera and pre-known map. The Fire fighting robots 1 enter a building and climb one or two floors-through stairs- to the fire area using remote control assistance. The robot 1 can search for injured people while extinguishing fire and send video information to controller.

Due to its compact design the Firefighting robot 1 can enter into high rise building through windows by using cranes (in case of elevator failure) to directly extinguish fire at early stage as well as search for injured people while extinguishing fire and send video information to controller. The robot 1 can be used in groups to fight larger fires or work for larger buildings.

A Plurality of robots 1 can serve as sensing sensor network in the building for early detection and extinguish. The fire robot can avoid obstacles while trying to rescue injured victims. If the robot is outside the building it can use camera and sensors for navigation utilizing the antenna. The robots 1 can enter the fire area in building and can put the fire with group of similar robots. It can deliver and provide portable oxygen mask 52 to those in building with fire. The robot 1 can secure exit path for those trapped inside. The set of robots 1 can serve as a fire-sensing sensor network in the building for early detection and extinguishing system.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A firefighting robot, comprising:

a robot platform having a double thermal insulation structure with a cooling system between a first and a second thermal structure of the double thermal insulation structure, the first and the second thermal structures each being comprised of a material with a low thermal conductivity and a strong thermal shock resistance;

a plurality of motors mounted to the robot platform;

a plurality of gears driven by the plurality of motors;

a plurality of tracks with an adaptable track shape driven by the plurality of gears;

a plurality of track covers that cover the plurality of tracks and the plurality of gears;

a driving camera mounted to a central front portion of the robot platform;

a computing means programmed for the robot to analyze and fight fires;

a remote control device adapted for controlling the computing means;

a power source;

a water tank;

a water sprinkler unit connected to the water tank and adapted for spraying water on the robot platform to lower the temperature of the robot platform;

an extinguishing system platform;

an extinguishing system comprising:

a plurality of extinguishing agent canisters attached to the extinguishing system platform;

a fire extinguishing nozzle connected to the plurality of extinguishing agent canisters; and a nozzle open/close wire unit for operating the fire extinguishing nozzle;

the robot further comprising a pan/tilt mount mechanism connected to the extinguishing system platform, the pan/tilt mount mechanism comprising:

a pan/tilt pole connected to the extinguishing system platform;

a linear actuator adapted for moving the pan/tilt pole up and down;

a pan/tilt axis element connected to an end of the extinguishing system platform and adapted for allowing a tilting motion of the extinguishing system platform while the pan/tilt pole moves up and down; and a DC motor adapted for simultaneously rotating the pan/tilt pole and the extinguishing system platform.

2. The firefighting robot according to claim 1, further comprising: a shape shift motor adapted for changing a configuration of one or more of the tracks.

3. The firefighting robot according to claim 1, wherein each of said tracks can move in opposite directions.

4. The firefighting robot according to claim 1, wherein said driving camera obtains frontal driving conditions of said firefighting robot.

5. The firefighting robot according to claim 1, further comprising: an oxygen mask container containing an oxygen mask, wherein the oxygen mask container is attached to said robot platform.

6. The firefighting robot according to claim 1, wherein the power source is a battery.

7. The firefighting robot according to claim 1, wherein said power source provides power to said plurality of motors, said driving camera, said cooling system, and said water sprinkler unit.

8. The firefighting robot according to claim 1, wherein said computing means is programmed to control said plurality of motors, said extinguishing nozzle, and said pan/tilt mount mechanism.

9. The firefighting robot according to claim 1, wherein the remote control device can display images from said driving camera and information from said computing means.

10. The firefighting robot according to claim 1, wherein said robot can secure an exit path for individuals trapped inside of a building.

11. The firefighting robot according to claim 1, wherein said robot can be used as a fire-sensing sensor network in a building for early detection and extinguishing of fires.

12. The firefighting robot according to claim 11, wherein a plurality of said robots can be used for fighting large fires in the building.

13. The firefighting robot according to claim 1, wherein a plurality of said robots can be launched and can work together inside a room or multiple rooms of a burning building with assistance of a remote control unit.

14. The firefighting robot according to claim 1, wherein said robot can be installed in a building.

15. The firefighting robot according to claim 14, wherein a set of said robots can serve as a fire-sensing sensor network in the building.

16. The firefighting robot according to claim 1, wherein the pan/tilt mount mechanism has a vision optical fiber bundle located thereon.

17. The firefighting robot according to claim 1, wherein the extinguishing system is protected by an extinguisher cover connected to the pan/tilt mount mechanism.

18. The firefighting robot according to claim 1, wherein the robot is of a compact size.

* * * * *